(12) United States Patent
Spangler

(10) Patent No.: US 10,434,863 B2
(45) Date of Patent: Oct. 8, 2019

(54) MULTIMODE CLUTCH FOR THROUGH-THE-ROAD HYBRID VEHICLE

(71) Applicant: BorgWarner Inc., Auburn Hills, MI (US)

(72) Inventor: Christopher A. Spangler, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 249 days.

(21) Appl. No.: 15/503,757

(22) PCT Filed: Aug. 19, 2015

(86) PCT No.: PCT/US2015/045791
§ 371 (c)(1),
(2) Date: Feb. 14, 2017

(87) PCT Pub. No.: WO2016/028836
PCT Pub. Date: Feb. 25, 2016

(65) Prior Publication Data
US 2017/0240038 A1    Aug. 24, 2017

Related U.S. Application Data

(60) Provisional application No. 62/040,701, filed on Aug. 22, 2014.

(51) Int. Cl.
*B60K 6/38* (2007.10)
*B60K 6/24* (2007.10)
(Continued)

(52) U.S. Cl.
CPC .................. *B60K 6/38* (2013.01); *B60K 6/24* (2013.01); *B60K 6/26* (2013.01); *B60K 6/48* (2013.01);
(Continued)

(58) Field of Classification Search
None
See application file for complete search history.

(56) References Cited

U.S. PATENT DOCUMENTS 5,996,758 A * 12/1999 Baxter, Jr. .............. F16D 41/16
192/43.1
6,739,440 B1 * 5/2004 Dick ....................... F16D 41/16
192/39
(Continued)

*Primary Examiner* — Justin Holmes
(74) *Attorney, Agent, or Firm* — Miller, Matthias & Hull LLP

(57) ABSTRACT

A multimode clutch may be adapted for selectively connecting and disconnecting front and/or rear axles from respective internal combustion engine and electric motor powertrains connected to such front and rear driving axles in a through-the-road hybrid vehicle. For example, the engine may be part of a front axle driven powertrain connected to the front wheels, while the motor may be part of a separate rear axle driven powertrain connected to the rear wheels, or vice versa. By selective disconnection of an axle not being actively driven, a real time reduction in parasitic losses may be achieved, leading to higher overall operating efficiencies. The multimode clutch offers greater flexibility over the use of standard friction clutches; each multimode clutch may provide four distinct operational modes for accommodating a wide diversity of driving conditions. For example, bi-rotational freewheeling of the rear axle may occur whenever the motor is not in use.

18 Claims, 7 Drawing Sheets

(51) Int. Cl.

| | | |
|---|---|---|
| *B60K 6/26* | (2007.10) | |
| *B60K 17/02* | (2006.01) | |
| *B60K 17/356* | (2006.01) | |
| *F16D 41/16* | (2006.01) | |
| *B60K 6/48* | (2007.10) | |
| *B60K 6/52* | (2007.10) | |
| *B60W 10/02* | (2006.01) | |
| *B60W 10/06* | (2006.01) | |
| *B60W 10/08* | (2006.01) | |
| *B60W 10/119* | (2012.01) | |
| *B60W 20/40* | (2016.01) | |
| *F16D 48/06* | (2006.01) | |

(52) U.S. Cl.
CPC ............... *B60K 6/52* (2013.01); *B60K 17/02* (2013.01); *B60K 17/356* (2013.01); *B60W 10/02* (2013.01); *B60W 10/06* (2013.01); *B60W 10/08* (2013.01); *B60W 10/119* (2013.01); *B60W 20/40* (2013.01); *F16D 41/16* (2013.01); *F16D 48/06* (2013.01); *B60W 2710/021* (2013.01); *B60W 2710/06* (2013.01); *B60W 2710/08* (2013.01); *B60Y 2200/92* (2013.01); *B60Y 2300/182* (2013.01); *B60Y 2300/42* (2013.01); *B60Y 2300/43* (2013.01); *B60Y 2300/60* (2013.01); *B60Y 2400/42* (2013.01); *B60Y 2400/82* (2013.01); *F16D 2500/1066* (2013.01); *F16D 2500/10412* (2013.01); *F16D 2500/10431* (2013.01); *F16D 2500/10493* (2013.01); *Y10S 903/912* (2013.01); *Y10S 903/916* (2013.01); *Y10S 903/93* (2013.01)

(56) References Cited

U.S. PATENT DOCUMENTS

| | | | |
|---|---|---|---|
| 7,040,433 B2* | 5/2006 | Yamamoto | B60K 6/44 180/65.225 |
| 7,766,790 B2* | 8/2010 | Stevenson | B60K 6/365 192/43.1 |
| 9,366,298 B2* | 6/2016 | Bird | F16D 41/125 |
| 2005/0115755 A1* | 6/2005 | Sakai | B60K 6/36 180/243 |
| 2007/0034471 A1* | 2/2007 | Asano | B60K 6/52 192/48.6 |
| 2009/0084653 A1* | 4/2009 | Holmes | B60K 6/50 192/41 A |
| 2012/0077633 A1* | 3/2012 | Mueller | B60K 6/365 475/5 |
| 2012/0165146 A1* | 6/2012 | Samie | F16D 25/0638 475/5 |
| 2012/0197474 A1* | 8/2012 | Pieralisi | B60K 6/26 701/22 |
| 2013/0150211 A1* | 6/2013 | Aoki | B60K 6/46 477/86 |
| 2013/0296129 A1* | 11/2013 | Itakura | F16D 21/04 477/8 |

\* cited by examiner

Fig. 7

| VEHICLE OPERATING MODE | MMCM MODE | ENGINE SPEED | GEARBOX OUTPUT SPEED | DIFFERENTIAL INPUT SPEED |
|---|---|---|---|---|
| ENGINE PROPELLING VEHICLE | LOCK / LOCK | VARIABLE - BETWEEN IDLE AND MAX SPEED | VARIABLE | SAME AS GEARBOX OUTPUT |
| ENGINE OFF EMOTOR PROPELLING VEHICLE | OPEN / OPEN | OFF - 0 RPM | 0 RPM | FUNCTION OF VEHICLE ROAD SPEED |
| TRANSITION - ENGINE ON TO OFF EMOTOR PROPELLING VEHICLE | OPEN / OPEN | DROPS FROM > IDLE TO ZERO SPEED | DROPS TO 0 RPM | FUNCTION OF VEHICLE ROAD SPEED |
| TRANSITION - ENGINE OFF TO ON EMOTOR PROPELLING VEHICLE | LOCK / OPEN | INCREASES FROM ZERO TO TARGET SYNCHRONOUS SPEED | INCREASES FROM 0 TO SAME SPEED AS DIFFERENTIAL | FUNCTION OF VEHICLE ROAD SPEED |

Fig. 8

| VEHICLE OPERATING MODE | MMCM MODE | EMOTOR SPEED | DIFFERENTIAL SPEED |
|---|---|---|---|
| EMOTOR PROPELLING VEHICLE OR EMOTOR REGENERATING POWER | LOCK / LOCK | VARIABLE-BETWEEN 0 AND MAX SPEED | SAME AS EMOTOR |
| EMOTOR OFF ENGINE PROPELLING VEHICLE | OPEN / OPEN | OFF - 0 RPM | FUNCTION OF VEHICLE ROAD SPEED |
| TRANSITION-EMOTOR ON TO OFF ENGINE PROPELLING VEHICLE | OPEN / OPEN | DROPS FROM > IDLE TO ZERO SPEED | FUNCTION OF VEHICLE ROAD SPEED |
| TRANSITION-EMOTOR OFF TO ON ENGINE PROPELLING VEHICLE | LOCK / OPEN | INCREASES FROM ZERO TO TARGET SYNCHRONOUS SPEED | FUNCTION OF VEHICLE ROAD SPEED |

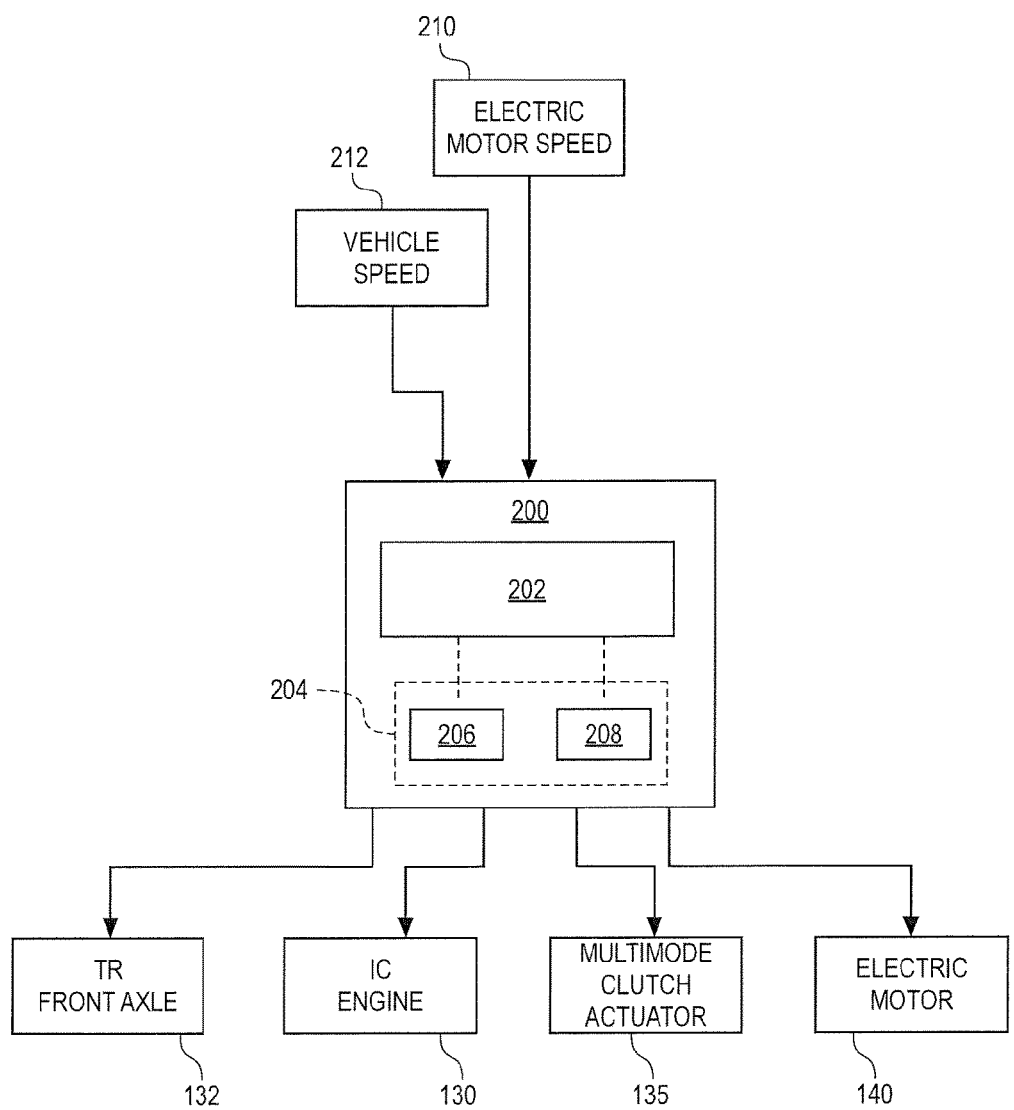

MULTIMODE CLUTCH FOR THROUGH-THE-ROAD HYBRID VEHICLE

CROSS-REFERENCE TO RELATED APPLICATION

This application is a 35 USC § 371 national phase application claiming priority to U.S. Provisional Application Ser. No. 62/040,701 filed on Aug. 22, 2014.

TECHNICAL FIELD

This disclosure relates generally to through-the-road hybrid vehicles having a combustion engine driving one axle and an electric motor independently driving a second axle, and in particular to such a hybrid vehicle employing dual power sources, with at least one multimode mechanical clutch adapted to disconnect at least one of the two axles from its respective power source.

BACKGROUND

Hybrid vehicles are typically powered by the combination of a combustion engine and an electric motor. In a "through-the-road" hybrid vehicle, at least two axles are separately driven; the combustion engine is configured to power one axle, while the electric motor is configured to separately and independently power the second axle.

FIG. 1 is a schematic illustration of an exemplary "through-the-road" hybrid vehicle 10, as already known in the art. The vehicle 10 includes a first axle 12, adapted to drive a first pair of wheels 14, 16 through a first differential 18. The vehicle 10 includes a second axle 20, adapted to drive a second pair of wheels 22, 24 through a second differential 26. Although the first pair of wheels 14, 16 as depicted herein may be front wheels, and the second pair of wheels 22, 24 may be rear wheels, either pair of wheels, depending on the nature of a given vehicle 10, may constitute front wheels or rear wheels of the vehicle 10.

The vehicle 10 includes a front axle powertrain 28, including an internal combustion engine 30 coupled with a transmission (or gearbox) 32 through a friction clutch 34. For this purpose the transmission 32 includes an input (not shown) adapted to engage and disengage with the friction clutch 34 at an end of the transmission nearest the engine 30. Internal gearing and an output shaft (neither shown) of the transmission 32 transmit engine torque via the friction clutch 34 from the engine 30 to the first differential 18 by a drive shaft (not shown). In the through-the-road embodiment described herein, the powertrain 28 is configured to only power the first axle 12 and its associated components, including the first differential 18.

As is typical, in the through-the-road vehicle 10 the second, or rear, axle 20 is, unlike the first axle 12, separately and independently powered by an electric motor 40. As such, the electric motor 40 drives the rear wheels 22, 24 through an optional gearbox 42 (to provide, for example, a two-speed gear ratio capability) having an output shaft (not shown) coupled to the second differential 26. Alternatively, the electric motor 40 may have an output shaft coupled directly to the second differential 26 for providing a single speed drive configuration. Irrespective of whether the rear axle is a single or two speed, the electric motor 40, including the second differential 26, and other components configured to drive the second axle 20 may be referred to herein as the rear axle powertrain 44.

Adjunctive to the rear axle powertrain 44 is an inverter 50 configured for selectively providing regenerative power to a rechargeable battery 52 adapted to power the electric motor.

The components of the described hybrid vehicle 10 may be operated and/or controlled in accordance with driving conditions to optimize efficient utilization of the front and rear axle powertrains 28, 44; i.e., the internal combustion engine 30 and the electric motor 40, respectively, in different ways. For example, during a combination of stop and go and/or slower driving in urban areas, the rear electric motor-driven powertrain 44 may be utilized more than the front internal combustion engine powertrain 28 to the extent that the powertrain 44 may offer most efficient power while saving fuel. However, during highway driving with less stop and go and at higher speeds, higher utilization of the power train 28 may prove most efficient, for reasons those skilled in the art may best appreciate.

During use of internal combustion engine powertrain 28, the friction clutch 34 is engaged and disengaged to selectively connect and disconnect the internal combustion engine 30 to the transmission 32 so that power from the engine 30 is delivered to the front axle 12. At the same time the front axle 12 is driven, the electric motor 40 may be controlled to provide additional power boosts to the rear axle 20, or to alternatively use the power supplied by the internal combustion engine 30 to recharge the battery 52. Conversely, during urban driving situations, the friction clutch 34 may be opened to disconnect the engine 30 from driving the front axle 12, and power from the battery 48 may be used by the motor 40 to drive the vehicle 10 via the rear axle 20. During the latter driving condition, the engine 30 may be completely stopped, and/or the friction clutch 34 opened, or disengaged, to conserve fuel. However, during a momentary acceleration of the vehicle 10, the friction clutch 34 may be re-engaged to provide more responsive acceleration, thus utilizing power from both the engine 30 and the motor 40. In another variation, the friction clutch 34 may be opened or disengaged to disconnect the engine 30 during deceleration so that the motor 40 may more efficiently recharge the battery 48; i.e. without power losses due to engine friction.

Under presently known arrangements of the friction clutch 34 in the through-the-road hybrid vehicle 10, the friction clutch 34 in its engaged or closed position is configured to lock the front axle powertrain 28 for rotation of the front axle in either direction. In the disengaged or open position of the friction clutch 34, the front axle 12 is free to rotate in either direction. This arrangement may create inefficiencies in operation of the hybrid vehicle 10. Whenever the friction clutch 34 is engaged for driving the vehicle 10 under the power of the engine 30, or while the vehicle 10 is accelerating under the combined power of the engine 30 and the electric motor 40, any slowing the engine 30 may cause rotating losses as the front axle powertrain 28 slows, unless the friction clutch 34 is actuated to open to disconnect the engine 30 from the transmission 32.

If the friction clutch 34 remains closed, engine rotating losses will be incurred. The latter may be desirable for such vehicles 10 in situations where engine braking is desirable. In most hybrid vehicles, however, regenerative battery power braking is preferred instead, so as to most effectively re-energize the rechargeable battery 52 through the inverter 50. If the friction clutch 34 is actuated to disconnect the engine 30, the engine rotating losses may be avoided, but open friction clutch rotating losses remain, as the relatively large surface areas of the facing clutch plates are subjected to oil shear with resulting viscous drag.

In addition, since the friction clutch 34 must be reclosed whenever the engine 30 is called upon to provide power to the driven wheels 14, 16, the options of leaving the friction clutch 34 closed, may negate efficiencies sought to be achieved by the hybrid vehicle 10. As such, opening and closing the friction clutch 34, may effectively negate the efficiencies sought to be achieved, due to the viscous drag and corresponding open clutch rotating losses, as well as increases in duty cycle required for actuating the friction clutch 34. Therefore, a need exists for an improved strategy for switching between the power sources of a through-the-road hybrid vehicle that can increase energy efficiencies without increasing rotating losses.

SUMMARY OF THE DISCLOSURE

In accordance with one aspect of the present disclosure, a hybrid vehicle includes first and second axles, each axle having a driven wheel at each end thereof. An internal combustion engine driven powertrain is selectively operatively connected to the first axle, and an electric motor driven powertrain is independently and selectively operatively connected to the second axle. A multimode clutch is configured to operatively interconnect at least one of (a) the engine driven powertrain and the first axle, and (b) the motor driven powertrain and the second axle.

In accordance with another aspect of the present disclosure, the hybrid vehicle further includes the multimode clutch having a first mode allowing the first axle and the engine driven powertrain to rotate independently of each other in both directions of rotation, and a second mode wherein the multimode clutch operatively couples the first axle to the engine driven powertrain so that the first axle and engine driven powertrain rotate together in one direction and rotate independently of each other in an opposite direction.

In accordance with yet another aspect of the present disclosure, the hybrid vehicle further includes a third mode of the multimode clutch wherein the multimode clutch operatively couples the first axle to the engine driven powertrain so that the first axle and the engine driven powertrain rotate together in both directions of rotation.

In accordance with a still further aspect of the present disclosure, the hybrid vehicle further includes a controller operatively connected to the electric motor driven powertrain, the controller being configured to transmit control signals to the electric motor and to the internal combustion engine to control speed of the electric motor relative to that of the internal combustion engine as a combined function of vehicle speed and electric motor speed during transitions between front and rear powertrains.

In accordance with yet another aspect of the present disclosure, the multimode clutch of the hybrid vehicle includes a first race defining an axis, wherein one of the engine and motor driven powertrains and the first and second axles is operatively connected to the first race for rotation therewith, a second race radially disposed about the same axis, and extending circumferentially about the axis, wherein the other one of the powertrains and the axles is operatively connected to the second race for rotation therewith, opposed pairs of pawls operatively connected to the first race and being movable relative to the first race, and an actuator cam adapted for movement relative to the second race.

In accordance with yet another aspect of the present disclosure, the hybrid vehicle further includes a first selectable actuator cam position corresponding to a first mode of the multimode clutch, the actuator cam engaging the pairs of opposed pawls to prevent the pawls from engaging the second race and to permit the first race to rotate in both a first rotational direction and a second rotational direction independently of the second race.

In accordance with yet another aspect of the present disclosure, the hybrid vehicle further includes a second selectable actuator cam position corresponding to a second mode of the multimode clutch, wherein rotation of the first race in a first rotational direction causes a first of the pairs of opposed pawls to engage the second race and to thereby lock the first race and the second race together for rotation in the first rotational direction, and wherein rotation of the first race in the second rotational direction causes a second of the pairs of opposed pawls to engage the second race and thereby lock the first race and the second race together for rotation in the second rotational direction.

Additional aspects are defined by the claims of this patent.

BRIEF DESCRIPTION OF THE DRAWINGS

FIG. 7 is a first chart detailing various front axle powertrain operating configurations;

FIG. 8 is a second chart detailing various rear axle powertrain operating configurations; and FIG. 9 is a flowchart depicting an exemplary electronic control unit and associated components that may be utilized in the through-the-road hybrid vehicle of FIG. 2.

DETAILED DESCRIPTION

Although the following description addresses numerous embodiments, each embodiment herein is intended to be exemplary only. Numerous alternative embodiments not set forth herein may be implemented in accordance with the disclosure as well, and they also may fall within the scope of the appended claims the define scope of protection. Moreover, the terms recited in the claims are not intended to be limiting, for example, by implication or otherwise, to have a single particular meaning.

Figure 2:
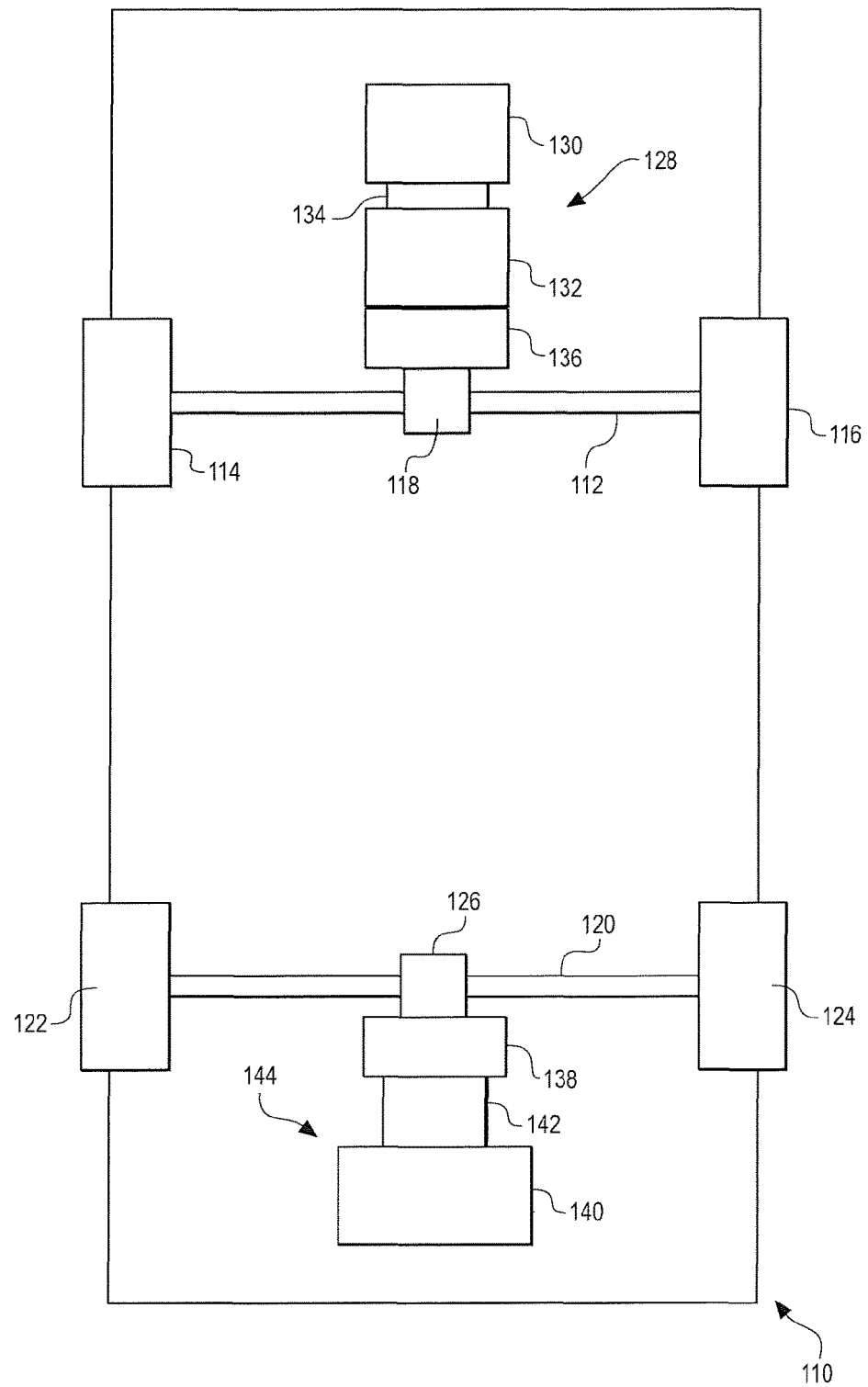
FIG. 2 is a schematic illustration of a through-the-road hybrid vehicle incorporating multimode clutches in accordance with the present disclosure.

Making reference now to FIG. 2, a schematic illustration of an embodiment of a through-the-road hybrid vehicle 110 constructed in accordance with the present disclosure includes a first axle 112 adapted to drive a pair of driven front wheels 114, 116 through a first differential 118. The vehicle 110 includes a second axle 120 adapted to drive a second pair of wheels 122, 124 through a second differential 126. Although the first pair of wheels 114, 116 as depicted may be front wheels, and the second pair of wheels 122, 124 may be rear wheels, either pair of wheels, depending on the nature of a given vehicle 110, may constitute front wheels or rear wheels of the vehicle 110.

The vehicle 110 includes a front axle powertrain 128 adapted to drive the front axle 112. The powertrain 128 includes an internal combustion engine 130 coupled with a transmission (or gearbox) 132, driven by the engine through a torque converter 134. A multimode clutch 136 is interposed between the transmission 132 and the differential 118. The multimode clutch 136 and its operation are discussed in detail below. In the configuration shown, engine torque is transmitted from the engine 130, through the torque converter 134, and ultimately through the first axle 112 via the first differential 118. In the through-the-road embodiment described herein, the powertrain 128 is configured to power only the first axle 112 and its associated components, including the first differential 118.

The through-the-road hybrid vehicle 110 incorporates a second axle 120 that is separately and independently powered by an electric motor 140. As configured, the electric motor 140 selectively drives the rear wheels 122, 124 through an optional gearbox 142 having an output shaft (not shown) coupled to the second differential 126. Alternatively, the electric motor 140 may have an output shaft coupled directly to the second differential 126 for providing a single speed drive configuration. Irrespective of whether the rear axle is a single or two speed, the electric motor 140, including the second differential 126, and other components configured to drive the second axle 120 are referred to herein as the rear axle powertrain 144.

Interposed between the gearbox 142 and a differential 126 is a second multimode clutch 138 that operates similar to the multimode clutch 136 of the front axle powertrain 128. An inverter and rechargeable battery (neither shown in FIG. 2) are also associated with the rear axle powertrain 144, and have functions similar to those already described with respect to FIG. 1, including transfer of electrical power between the electric motor 140 and the rechargeable battery.

Figure 3:
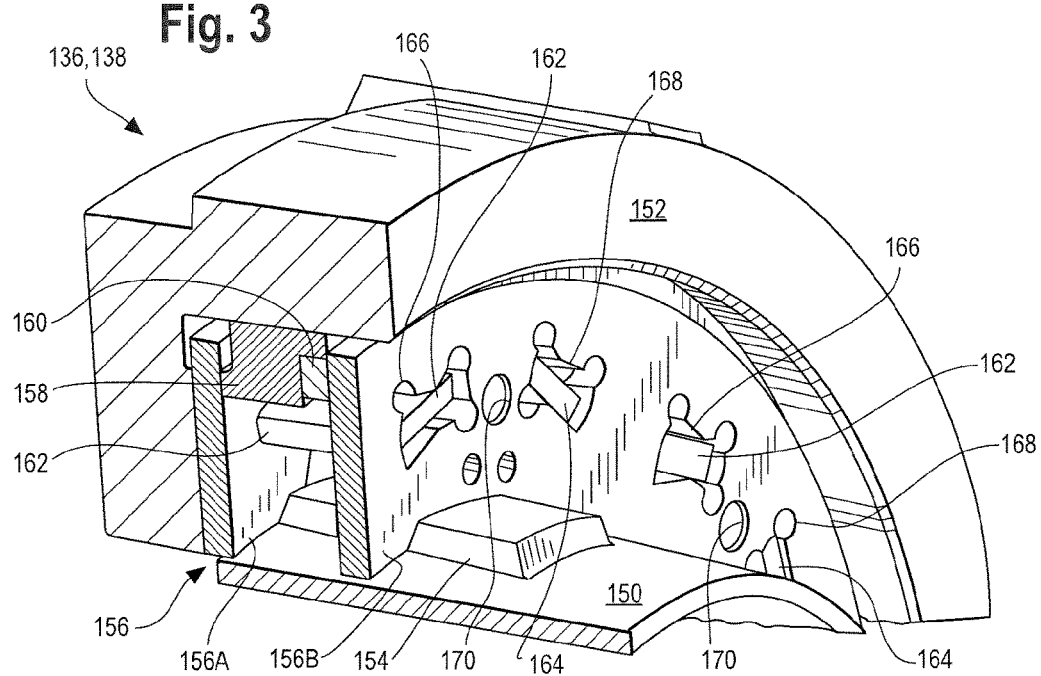
FIG. 3 is both a perspective and a cross-sectional view of a portion of one possible embodiment of a multimode clutch schematically depicted in the through-the-road hybrid vehicle of FIG. 2.

Referring now to FIG. 3, front and rear multimode clutches 136, 138 of the through-the-road hybrid vehicle 110 of FIG. 2 may be utilized in lieu of the friction-style clutch 34 typically used in the through-the-road hybrid vehicle 10. In fact, those skilled in the art will appreciate that, with upon incorporation of the multimode clutch 136, 138, the clutch 34 can be replaced by the simple torque converter 134 shown in FIG. 2.

The multimode clutch 136, 138 may be of the type illustrated and described in U.S. Prov. Appl. Ser. No. 61/758,356 filed on Jan. 30, 2013 by Papania, entitled "Multi-Mode Clutch Module," which is expressly incorporated by reference herein.

The multimode clutch 136 may be identical to, and work similarly to, the multimode clutch 138. Thus, for the sake of brevity, the multimode clutch 136, 138 will only be described with respect to the front axle in the illustrated embodiment. Those skilled in the art will appreciate that the multimode clutch 136, 138 may incorporate an interior driven hub 150 that may be operatively connected to an output shaft (not shown) of the internal combustion engine 130 for rotation therewith, and an outer housing 152 that may be operatively connected to a transmission shaft (not show) for rotation therewith. Those skilled in the art will understand that, alternatively, the driven hub 150 may be operatively connected to the transmission shaft, and the outer housing 152 may be connected to the output shaft. The driven hub 150 may contain an array of circumferentially spaced cogs 154 adapted to secure a first, inner, race 156 to the driven hub 150 for rotation therewith. As disclosed, the inner race 156 is physically comprised of first and second spaced inner race plates 156A, 156B. A second, outer, race 158 sandwiched between the pair of inner race plates 156A, 156B, is situated to allow for relative rotation between the inner race 156 and the outer race 158, and with the outer race 158 being operatively coupled to the outer housing 152 for rotation therewith.

In the present design of the multimode clutch 136, 138, an actuator cam 160 is interposed between one of the inner race plates 156A, 156B and the outer race 158 for rotation over a predetermined angle about a common axis of the driven hub 150 and the outer housing 152 to control movements of pairs of opposed pawls 162, 164 as will be described further hereinafter. The sets of pawls 162, 164 are trapped, and hence retained, between the inner race plates 156A, 156B to allow limited angular movements of the pawls 162, 164 held within bowtie-shaped apertures 166, 168, respectively, subject to the control of the actuator cam 160. In each set, the combined pawl 162 and corresponding aperture 166 is similar to but oppositely oriented to the combined pawl 164 and corresponding aperture 168. The elements of the multimode clutch 136, 138 are contained within the outer housing 152. A plurality of spaced apertures 170 are adapted to accommodate rivets (not shown) for providing fixed and rigid securement of each of the inner race plates 156A and 156B relative to the other.

Figure 4:
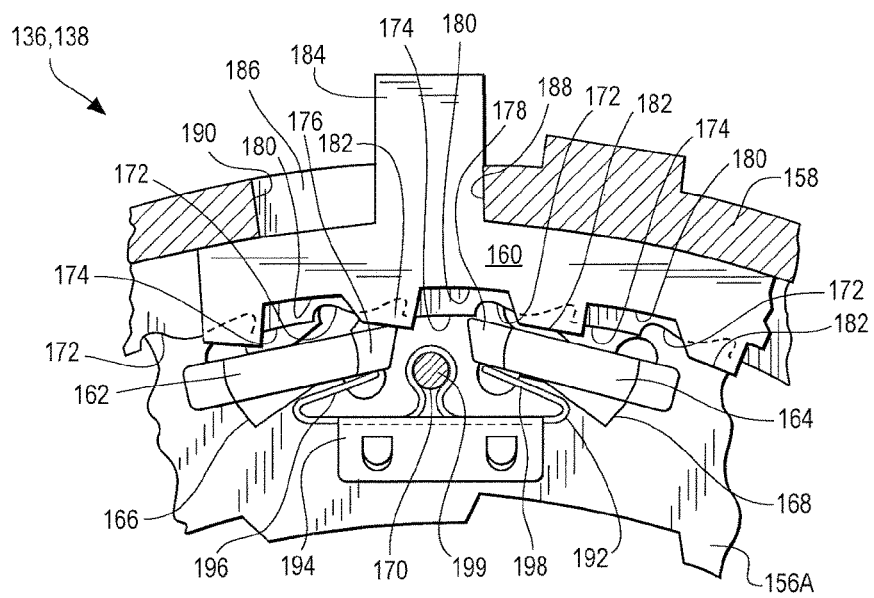
FIG. 4 is an enlarged side view of a portion of one possible embodiment of the multimode clutch of FIG. 3 with the near inner race plate removed to reveal the internal components, and with an actuator cam in a one-way locked, one-way unlocked position.
Figure 5:
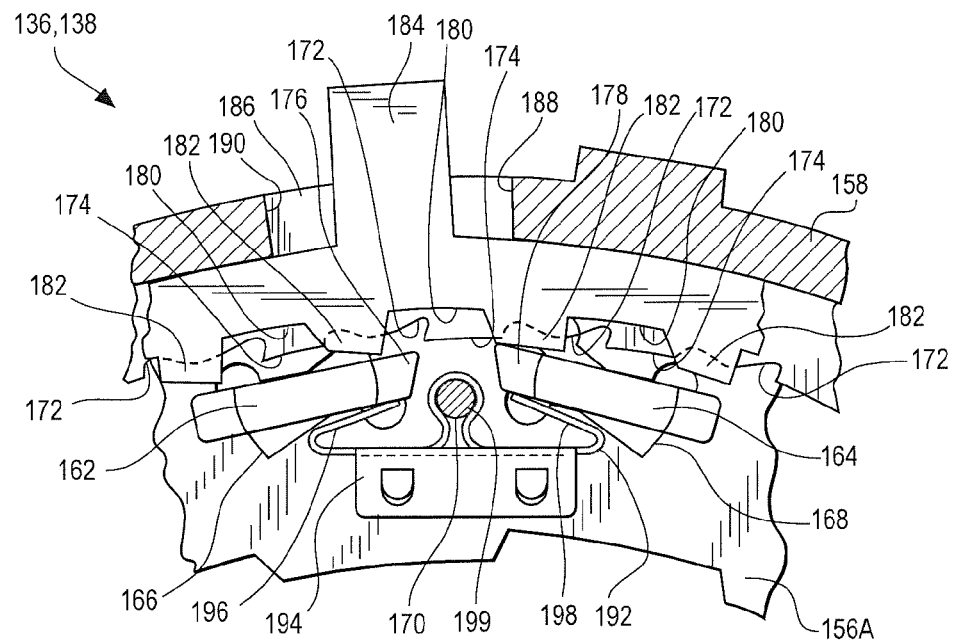
FIG. 5 is a view of the same portion of FIG. 4, but with the actuator cam shown in a two-way unlocked position.
Figure 6:
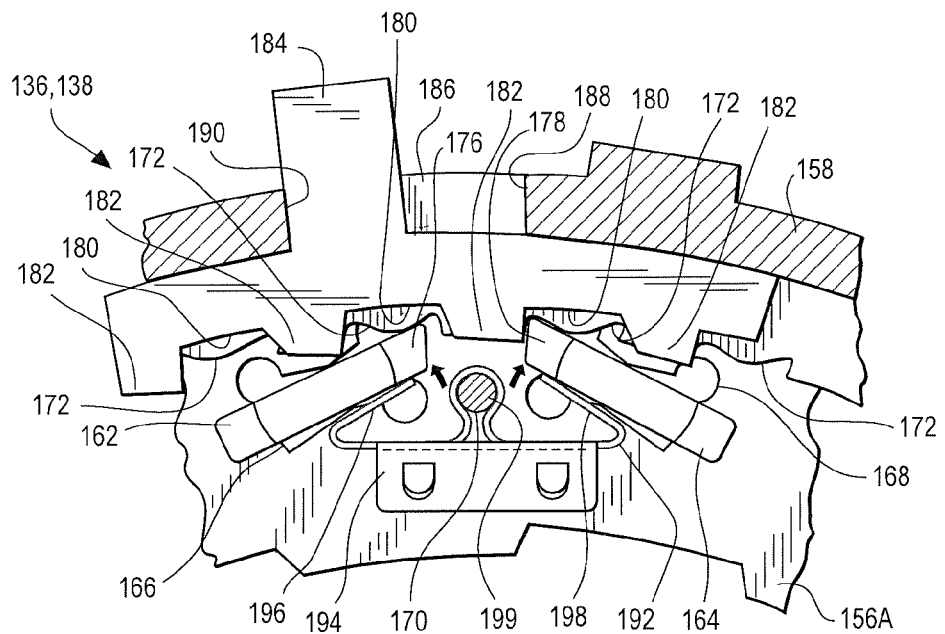
FIG. 6 is a view of the same portion of FIGS. 4 and 5, but with the actuator cam shown in a two-way locked position.

The components of the multimode clutch 136, 138 are depicted in FIGS. 4-6 to illustrate various operational modes of the multimode clutch 136, 138 for controlling the relative rotation between the output shaft of the engine 130 and the transmission shaft. Referring first to FIG. 4, the outer race 158 is configured to accommodate interactions with the pawls 162, 164 by providing the inner circumference of the outer race 158 with circumferentially spaced notches 172, each defined by and positioned between pairs of radially inwardly projecting cogs 174. The notches 172 and cogs 174 are configured so that, in the absence of the actuator cam 160, a toe end 176 of each pawl 162 enters one of the notches 172 and is engaged by the corresponding cog 174 when the driven hub 150 and the inner race 156 rotate in a clockwise direction as viewed in FIG. 4 relative to the outer housing 152 and the outer race 158 to cause the output shaft 122 and transmission shaft 128 to rotate together. Similarly, a toe end 178 of each pawl 164 enters one of the notches 172 and is engaged by the corresponding cog 174 when the driven hub 150 and the inner race 156 rotate in a counterclockwise direction relative to the outer housing 152 and the outer race 158 to cause the output shaft 122 and transmission shaft 128 to rotate together.

Within its interior periphery, the actuator cam 160 incorporates a strategically situated array of circumferentially spaced recesses, herein called slots 180, defined by and situated between projections, herein called cam teeth 182. The slots 180 and cam teeth 182 are adapted to interact with the pawls 162, 164 to control their movement within the apertures 166, 168, respectively, and disposition within the notches 172 and engagement by the cogs 174 as will be described. The actuator cam 160 may further include an actuator tab 184 or other appropriate member or surface that may be engaged by a multimode clutch actuator (shown only schematically in FIG. 9) that is capable of causing the actuator cam 160 to move through its rotational range to the positions shown in FIGS. 4-6. The actuator device may be any appropriate actuation mechanism capable of moving the actuator cam 160, such as a hydraulic actuator such as that shown in the Papania reference cited above, a solenoid actuator, a pneumatic actuator or other appropriate device operatively coupled to the actuator cam and capable of rotating the actuator cam 160 to multiple positions. In the illustrated embodiment, the actuator tab 184 may be disposed within a slot 186 through the outer race and the rotation of the actuator cam 160 may be limited by a first limit surface 188 engaging the actuator tab 184 at the position shown in FIG. 4 and a second limit surface 190 engaging the actuator tab 184 at the position shown in FIG. 6.

The pawls 162, 164 are asymmetrically shaped, and reversely identical. Each of the opposed pawls 162, 164 is movably retained within its own bowtie-shaped pawl aperture 166, 168, respectively, of the inner race plates 156A and 156B. The toe end 176, 178 of each individual pawl 162, 164, respectively, is urged radially outwardly via a spring 192. Each spring 192 has a base 194, and a pair of spring arms 196 and 198. The spring arms 196 bear against the bottoms of the pawls 162, while the spring arms 198 bear against the bottoms of the pawls 164, each to urge respective toe ends 176, 178 into engagement with the cogs 174 of the outer race 158 when not obstructed by the cam teeth 182 of the actuator cam 160. It will be appreciated from FIG. 4 that axially extending rivets 199 are used to secure the inner race plates 156A, 156B together. The rivets 199 extend through the apertures 170 in each of the inner race plates 156A, 156B to hold the inner race plates 156A, 156B rigidly together, and to thus assure against any relative rotation with respect to the inner race plates 156A, 156B. In lieu of the rivets 199, other structural fasteners may be employed within the scope of this disclosure to secure the inner race plates 156A, 156B.

It will be appreciated that the actuator mechanism ultimately controls the actuator tab 184 which, in turn, moves the actuator cam 160 between multiple distinct angular positions. Thus, the positioning of the pawls 162, 164 as axially retained between the riveted inner race plates 156A, 156B is directly controlled by the actuator cam 160 against forces of springs 192. In FIG. 4, the actuator tab 184 is shown positioned by the actuator mechanism in a first, angularly rightward selectable position, representative of a first, one-way locked, one-way unlocked or open mode. In this position, the slots 180 and cam teeth 182 of the actuator cam 24 are positioned so that the toe ends 176 of the pawls 162 are blocked by cam teeth 182 from engagement with notches 172, and hence with the cogs 174 on the interior of the outer race 158. As such, the inner race 156 is enabled to freewheel relative to the outer race 158, and to thus provide for an overrunning condition when the inner race 156 and the driven hub 150 are rotating clockwise relative to the outer race 158 and the outer housing 152. Conversely, however, the position of the actuator cam 160 allows of the toe ends 178 of the pawls 164 to enter the slots 180 of the actuator cam 24 due to the biasing force of the spring arms 198, and to thereby directly engage the cogs 174 of the outer race 158 to lock the inner race 156 and the outer race 158 together whenever the inner race 156 and the driven hub 150 undergo a driving, or counterclockwise rotational movement, thereby causing the driven hub 150 and the outer housing 152 to rotate together.

FIG. 5 illustrates the actuator tab 184 placed by the actuator mechanism in a second, intermediate selectable position, representative of a two-way unlocked or open mode of the multimode clutch 136, 138. In this position, the slots 180 and the cam teeth 182 of the actuator cam 160 are positioned to prevent the toe ends 176, 178 of both pawls 162, 164 from entering the slots 180 of the actuator cam 160, and to maintain disengagement from the cogs 174 of the outer race 158. With the pawls 162, 164 blocked from engagement with the cogs 174, the inner race 156 and the driven hub 150 are enabled to freewheel relative to the outer race 158 and the outer housing 152 during relative rotation in either the clockwise or the counterclockwise direction.

In FIG. 6, the actuator tab 184 is shown in a third, angularly leftward selectable position, representative of a two-way locked mode of the multimode clutch 136, 138. In this configuration, the actuator cam 160 is positioned so that the toe ends 176, 178 of both pawls 162, 164 enter the slots 180 of the actuator cam 160 under the biasing forces of the spring arms 196, 198, respectively, and are engaged by the cogs 174 of the outer race 158 as described above to lock the inner race 156 and the driven hub 150 to the outer race 158 and the outer housing 152 for rotation therewith, irrespective of the rotational direction of the inner race 156 and the driven hub 150. Even though one specific embodiment of the multimode clutch 136, 138 is illustrated and described herein, those skilled in the art will understand that alternative configurations of multimode clutches are possible that provide operational modes or positions in addition to two-way locked and two-way unlocked modes, including one-way lock, one-way unlocked modes, and the implementation of such alternative multimode clutches in through-the-road hybrid vehicles 110 in accordance with the present disclosure is contemplated by the inventors.

The configuration of the multimode clutch 136, 138 illustrated and described herein is exemplary, and those skilled in the art will understand that alternative configurations of the multimode clutch 136, 138 may be implemented in vehicles 110 and are contemplated by the inventors. For example, depending on the operating requirements for the vehicle 110, various combinations of the illustrated modes of FIGS. 4-6 may be implemented by changing the configurations of the actuator cam 160 and/or the notches 172 and cogs 174 of the outer race 158. The vehicle requirements may not require both the one-way locked, one-way unlocked mode of FIG. 4 and the two-way locked mode of FIG. 6. In such cases, the cam teeth 182 and actuator tabs 184 may be reconfigured to place the multimode clutch (124) in the two-way unlocked mode of FIG. 5 and the required one of the modes of FIGS. 4 and 6. Moreover, it may be necessary or desired to provide separate one-way locked, one-way unlocked modes for both directions of rotation so that in one mode the pawls 162 engage the outer race 158 when the inner race 156 rotates clockwise as viewed in the drawing figures, and in another mode the pawls 164 engage the outer race 158 when the inner race 156 rotates counterclockwise.

Additionally, the relationships between the inner race 156, the outer race 158 and the pawls 162, 164 may be varied as necessary to alternatively lock and unlock the inner race 156 and the outer race 158. For example, the apertures 166, 168 and, correspondingly the pawls 162, 164, may be positioned on the outer race 158, and the inner race 156 may be provided with corresponding structures for engaging the pawls 162, 164 when necessary to lock the inner race 156 and the outer race 158. Moreover, it is contemplated that the pawls 162, 164 may be capable of moving through alternative paths of motion into and out of engagement with their corresponding locking structures, with the actuator cam 160 and a multimode clutch actuator 135 configured to move the pawls 162, 164 along the required paths of motion. For example, the pawls 162, 164 could move radially or axially between locked positions and unlocked positions instead of through rotation as shown in the illustrated embodiments.

It is also contemplated that other multimode clutches may be implemented in the through-the-road hybrid vehicle 110 as alternatives to the multimode clutch 136, 138 illustrated and described herein and that may be capable of operating to couple and uncouple the output shaft and transmission shaft as necessary to implement a power control strategy for the vehicle 110. Examples of alternative clutches may be found in U.S. Pat. No. 6,062,361 issued on May 16, 2000 to Showalter, entitled "Acceleration Sensitive Double Overrunning Clutch," U.S. Pat. No. 6,092,634 issued on Jul. 25, 2000 to Kremer et al., entitled "Compliant Cage for a Roller-Type Bi-Directional One-Way Clutch Mechanism," U.S. Pat. No. 6,290,044 issued on Sep. 18, 2001 to Burgman et al., entitled "Selectable One-Way Clutch Assembly," U.S. Pat. No. 6,745,880 issued on Jun. 8, 2004 to Yuergens, entitled "Two-Way Clutch Assembly having Selective Actuation," U.S. Pat. No. 6,832,674 issued on Dec. 21, 2004 to Blair et al., entitled "Bi-Directional Four-Mode Clutch," U.S. Pat. No. 6,814,201 issued on Nov. 9, 2004 to Thomas, entitled "Bi-Directional Axially Applied Pawl Clutch Assembly," and U.S. Pat. No. 8,051,959 issued on Nov. 8, 2011 to Eisengruber, entitled "Controllable or Selectable Bi-Directional Overrunning Coupling Assembly," each of which is expressly incorporated by reference herein.

Additional alternative ratchet, spring, roller and ball, and sprag-type clutches configured to be controlled to operate in multiple coupling modes are also contemplated by the inventors as having use in through-the-road hybrid vehicles 110 in accordance with the present disclosure to control the coupling of the output shaft and the transmission shaft and implement a power distribution strategy for the internal combustion engine 130 and the electric motor 140 of the vehicle 110. For such alternative clutches, it is contemplated by the inventors that those skilled in art will be able to operatively couple the clutches between respective output and transmission shafts in the manner disclosed herein, and to operatively connect mode-switching actuation mechanisms of the clutches to control elements as described hereinafter to control the actuation mechanisms for transitioning between available operating modes of the clutches, and to control the power transmission in the vehicle 110 as discussed below.

In the embodiment of the vehicle 110 depicted in FIG. 2, the use of two multimode clutches 136, 138 is contemplated. The first multimode clutch 136 is employed as part of the first or front powertrain 128, and the second multimode clutch 138 is employed in the second or rear powertrain 144. Alternatively, this disclosure encompasses use of only one multimode clutch in the vehicle 110 as, for example, the use of a single front multimode clutch 136 in the first powertrain 128, while utilizing a simple friction or dog clutch, in lieu of the multimode clutch 138, in the rear powertrain 144. Conversely, a single rear multimode clutch 138 could be used in the second or rear powertrain 144, in concert with a simple friction or dog clutch, in lieu of the multimode clutch 136, in the front powertrain 128. While perhaps not necessarily ideal, the use of at least one multimode clutch in accordance with either of the above alternately described configurations could provide at least some efficiency improvements by reducing some of the system parasitic drag.

Referring now to FIG. 7, an operating chart outlines various configurations of the above-described multimode clutch 136 incorporated into the front axle powertrain 128. As disclosed, the multimode clutch 136 may be situated internal to the housing (not shown) of the transmission 132, physically juxtaposed between the gearbox (not shown) and the first differential 118. Such configuration would permit control of the multimode clutch via an electromagnetic actuation system or via an electro hydraulic actuation system. If electro hydraulically, transmission fluid may be utilized as a control oil source.

In accordance with the chart of FIG. 7, the multimode clutch 136 (referenced in the chart as an "MMCM", an acronym for "multimode clutch module" since the multimode clutches 136, 138 of this disclosure may be installed as a component or "module") may incorporate the following control modes, thus offering greater flexibility than any known prior art configurations:

1) While the internal combustion engine is propelling the vehicle 110, the multimode clutch 136 can be locked in both rotational positions of the front axle 112. This lock/lock configuration (FIG. 6) provides positive engagements for both forward and reverse rotations of the front axle 112, and is advantageous for utilization of a reverse gear configuration, as well as for flexibility of having engine braking availability (in lieu of providing battery power regeneration) while descending a hill.
2) While the electric motor is propelling the vehicle 110, the engine may be off, and the multimode clutch 136 may be open in both rotational directions (FIG. 5) of the front axle 112. This will substantially reduce parasitic losses during operation of the electric motor only.
3) During transition of the engine from on to off, with the electric motor propelling the vehicle 110, the multimode clutch 136 may be open in both rotational directions (FIG. 5), again substantially reducing parasitic drag.
4) During transition of the engine from off to on, while the electric motor is propelling the vehicle, the multimode clutch 136 may be locked in the driving rotational direction, while open in the non-driving rotational direction (FIG. 4), particularly as a synchronous speed as being achieved. Such a configuration allowing freewheeling in the one direction will allow the engine to endure an overrunning condition, such as might occur while descending a hill. At the same time, being locked in the driving direction allows the engine to increase speed from zero to a synchronous speed target for the transition to engine driving the front axle of the vehicle. Once the engine is driving the vehicle, the multimode clutch 136 is switched to the lock-lock mode of FIG. 6.

Referring now to FIG. 8, a second operating chart outlines various configurations of the above-described multimode clutch 138, as may be incorporated into the rear axle powertrain 144. The multimode clutch 138 is contemplated to be operated electro-mechanically, as no appropriately regulated hydraulic fluid source is normally provided at rear axle locations.

In accordance with the chart of FIG. 8, the multimode clutch 138 may incorporate the following control modes, again offering greater flexibility than any known prior art configurations:

1) While the electric motor 140 is either propelling the vehicle or regenerating battery power, the multimode clutch 138 can be locked in both rotational directions of the rear axle 120. A lock in both directions (FIG. 6) permits the electric motor to drive the vehicle or to transmit its energy via the inverter to achieve regenerative braking.
2) While the electric motor 140 is off, with the engine propelling the vehicle, the multimode clutch 138 may be configured to be open in both rotational directions (FIG. 5) to avoid parasitic drag otherwise produced by components of the rear axle powertrain 144.

3) During transition of the electric motor from on to off, while the engine is beginning to propel the vehicle, the multimode clutch 138 may be configured to be open in both directions (FIG. 5), again to reduce parasitic drag.

4) During transition of the electric motor 140 from off to on, while the engine is propelling the vehicle, the multimode clutch 138 may be configured to be locked in the driving direction, while open in the non-driving direction as the electric motor speed increases from zero to a target synchronous speed.

FIG. 9 illustrates one exemplary configuration of a controller 200 that may be implemented in the through-the-road hybrid vehicle 110 to efficiently control respective front and rear axle operations of the internal combustion engine 130 and the electric motor 140 to provide power to drive the vehicle 110 under various driving and operating conditions. The controller provides an integrated operation of the multimode clutch 136, 138 for selectively entering the one-way lock, one-way unlock mode of FIG. 4, the two-way unlock mode of FIG. 5 and the two-way lock mode of FIG. 6, in accordance with operating conditions of the vehicle 110. The controller 200 may include a microprocessor 202 for executing specified programs that control and monitor functions associated with the vehicle 110, including functions outside the scope of the present disclosure. The microprocessor 202 includes a memory 204, such as read only memory (ROM) 206, for storing a program or programs, and a random access memory (RAM) 208 which may serve as a working memory area for use in executing the program(s) stored in the memory 204.

Although the microprocessor 202 is shown herein, it is also possible and contemplated to use other electronic components such as a microcontroller, an ASIC (application specific integrated circuit) chip, or any other integrated circuit device. Although a single controller 200 for the vehicle 110 is illustrated and referenced herein, those skilled in the art will understand that the various processing functions described herein may be implemented across multiple control structures. For purposes of the present application, the controller 200 may refer collectively to the performance of the control strategy discussed herein even when implemented across multiple control devices.

The controller 200 electrically connects to the control elements of the through-the-road hybrid vehicle 110 (FIG. 2), as well as various input devices for commanding the operation of the vehicle 110 and for monitoring its performance. As a result, the controller 200 may be electrically connected to input devices providing control signals to the controller 200 that may include a speed controller 210 for the electric motor 140, such as a gas pedal or accelerator manipulated by an operator to regulate the speed of the vehicle 110, an vehicle speed sensor 212 for measuring actual road speed of the vehicle 110, such as a rotary speed sensor measuring rotational speed of an output shaft. By way of example, as a sub-controller for the rear axle power train that includes the electric motor 140, a controller 200 may be configured to be electrically connected to output devices to which control signals are transmitted and from which control signals may be received by the controller 200, such as, for example, the electric motor 140 of the vehicle 110, the transmission 132, the engine 130, and a multimode clutch actuator 135 associated with the rear axle, again by way of example only.

Those skilled in the art will understand that described input devices, output devices, and operations of the controller 200 provided herein are exemplary only, and that additional and alternative devices may be implemented in through-the-road hybrid vehicles 110 in accordance with the present disclosure to monitor operations of the vehicles 110, along with inputs provided by operators of the vehicles 110, and to control the engine 130, the electric motor 140, front and rear axle multimode clutches 136, 138, and other systems of the vehicle 110, to assure desired vehicle performance under a variety of driving conditions.

INDUSTRIAL APPLICABILITY

Figure 1:
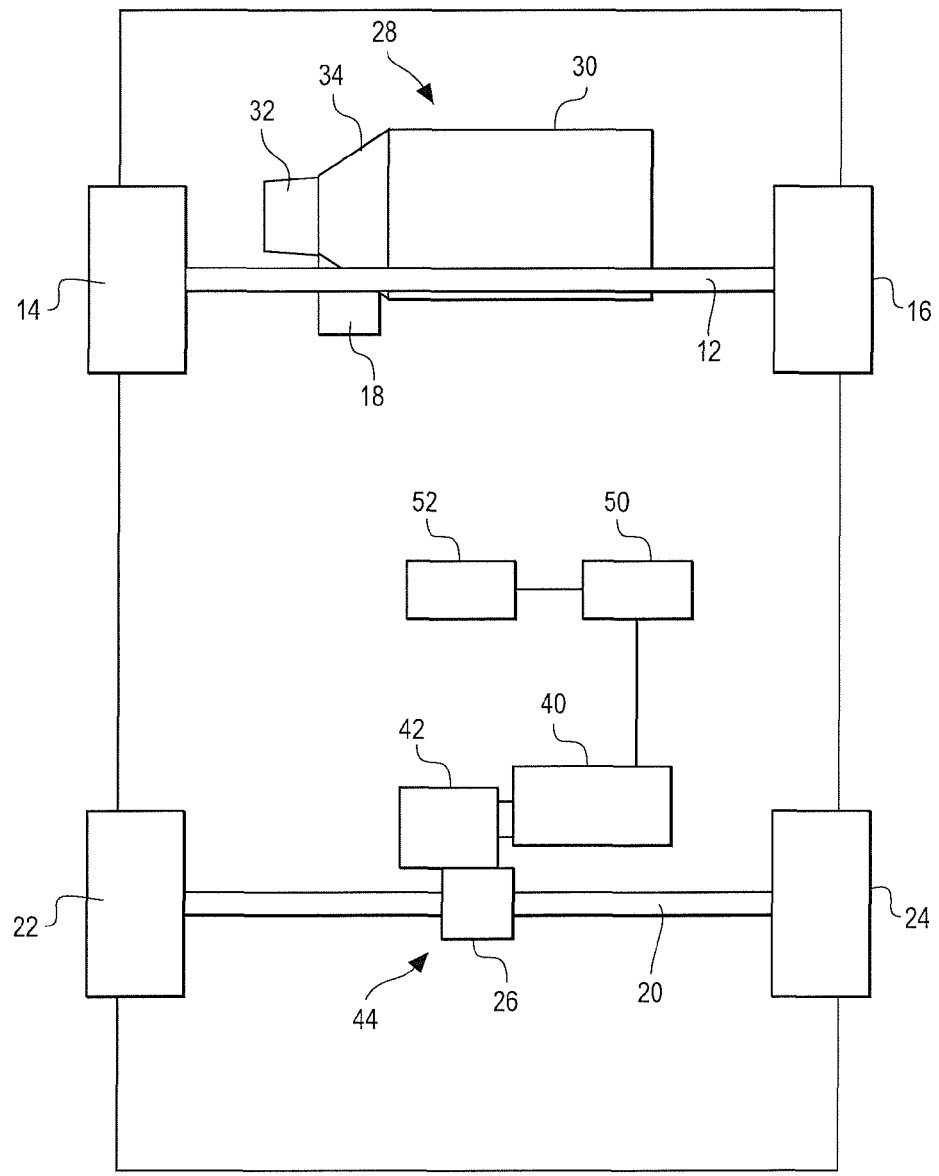
FIG. 1 is a schematic illustration of a presently known through-the-road hybrid vehicle of the type having a friction clutch connecting an internal combustion engine to a transmission.

Integration of the multimode clutch 136, 138 within the through-the-road hybrid vehicle 110 may allow for direct replacement of the friction clutch 34 of the hybrid vehicle 10 of FIG. 1. The multimode clutch 136, 138 can offer at least the three operating modes discussed above, including a one-way lock, one-way unlock mode (FIG. 4) wherein the multimode clutch 136, 138 locks in one direction and freewheels in the opposite direction; a two-way unlock mode (FIG. 5) wherein the multimode clutch 136, 138 freewheels in both directions; and a two-way lock mode (FIG. 6) wherein the multimode clutch 136, 138 is locked in both directions.

The controller 200 may be configured to cause the multimode clutch 136, 138 via the multimode clutch actuator 135 to alternate between the available operating modes based on the desired and/or experienced vehicle operation conditions. The specific strategy for operating the engine 130, the electric motor 140 and the multimode clutch 136, 138 to utilize the power of the engine 130 and/or the electric motor 140 to drive the vehicle 110, and to selectively engage the available modes of the multimode clutch 136, 138 to implement the strategy may vary depending on the operating requirements of the vehicle 110 and decisions made in designing the vehicle 110. An optimal strategy for maximizing the fuel efficiency of the vehicle 110 may take into account the charted examples provide in FIGS. 7 and 8. The examples set forth hereinafter are provided to illustrate various options for utilizing the inherent flexibility provided by the multimode clutch 136, 138.

As set forth in the foregoing, implementation of the multimode clutch 136, 138 in the through-the-road hybrid vehicle 110 as a substitute for the previously known friction clutch 34 may improve the efficiency of the vehicle 110. As just one example, the multimode clutch 136, 138 may improve the system efficiency of the through-the-road hybrid vehicle 110 by reduction of rotating losses, as may be achieved when the multimode clutch 136, 138 is in the one-way locked, one-way unlocked position of FIG. 4 to allow the transmission shaft to freewheel relative to the output shaft whenever the vehicle coasts or decelerates.

Moreover, although only two operative multimode clutches 136, 138 are depicted and described with respect to the vehicle 110, alternate embodiments may be configured to include at least two multimode clutches on each axle. For example, two of such clutches could be positioned on each of the axles 112 and 120. In one such configuration, one of a pair of front axle multimode clutches would be situated between each front axle wheel 114, 116 and the first differential 118, while one of a second pair of multimode clutches would be situated between each rear axle wheel 122, 124 and the second differential 126, demonstrating just one example of the potential flexibility of multimode clutch use.

What is claimed is:

1. A hybrid vehicle, comprising:
a first axle and a second axle;

each axle having a driven wheel at each end thereof;
an internal combustion engine driven powertrain selectively operatively connected to the first axle;
an electric motor driven powertrain independently and selectively operatively connected to the second axle;
a first multimode clutch configured to operatively interconnect the engine driven powertrain and the first axle;
a second multimode clutch configured to operatively interconnect the motor driven powertrain and the second axle;
a controller operatively connected to the engine driven powertrain electric, motor driven powertrain, first multimode clutch, and second multimode clutch.

2. The hybrid vehicle of claim 1, wherein the multimode clutch has a first mode allowing the first axle and the engine driven powertrain to rotate independently of each other in both directions of rotation, and a second mode wherein the multimode clutch operatively couples the first axle to the engine driven powertrain so that the first axle and engine driven powertrain rotate together in one direction and rotate independently of each other in an opposite direction.

3. The hybrid vehicle of claim 1, wherein the multimode clutch has a third mode wherein the multimode clutch operatively couples the first axle to the engine driven powertrain so that the first axle and the engine driven powertrain rotate together in both directions of rotation.

4. The hybrid vehicle of claim 1, wherein the controller is configured to transmit control signals to the electric motor and the internal combustion engine to control speed of the electric motor relative to that of the internal combustion engine as a combined function of vehicle speed and electric motor speed during transitions between powertrains.

5. The hybrid vehicle of claim 4, wherein the controller is configured to cause the first powertrain to be locked in both rotational directions of the first axle when the first powertrain is propelling the vehicle.

6. The hybrid vehicle of claim 4, wherein the controller is configured to cause the first powertrain to be open in both rotational directions when the second powertrain is propelling the vehicle.

7. The hybrid vehicle of claim 4, wherein the controller is configured to cause the multimode clutch of the first powertrain to be open in both rotational directions of the first axle during transition of power in the first powertrain from on to off; and
wherein the controller is configured to cause the multimode clutch of the first powertrain to be locked in the driving rotational direction of the first axle and open in the non-driving rotational direction of the first axle when the first powertrain is transitioning from off to on.

8. The hybrid vehicle of claim 4, wherein the controller is configured to cause the multimode clutch of the second powertrain to be locked in both rotational directions of the rear axle when the electric motor is propelling the vehicle; and
wherein the controller is configured to cause the multimode clutch of the second powertrain to be open in both rotational directions of the second axle when the electric motor is off, and while the engine is propelling the vehicle.

9. The hybrid vehicle of claim 4, wherein the controller is configured to cause the multimode clutch of the second powertrain to be open in both directions during transition of the electric motor from on to off, while the engine is starting to propel the vehicle; and
wherein the controller is configured to cause the multimode clutch of the second powertrain to be locked in the driving direction and open in the non-driving direction during transition of the electric motor from off to on, while the engine is propelling the vehicle.

10. A multimode clutch system configured to provide operational flexibility in a hybrid vehicle, the multiple mode clutch system comprising:
a first axle and a second axle;
each axle having a driven wheel at each end thereof;
an internal combustion engine driven powertrain selectively operatively connected to the first axle;
an electric motor driven powertrain independently and selectively operatively connected to the second axle; and
a first multimode clutch configured to operatively interconnect the engine driven powertrain and the first axle;
a second multimode clutch configured to operatively interconnect the motor driven powertrain and the second axle; and
a controller operatively connected to the first multimode clutch and the second multimode clutch to selectively engage and disengage the powertrains from the axles.

11. The multimode clutch system of claim 10, wherein the multimode clutch has a first mode allowing the first axle and the engine driven powertrain to rotate independently of each other in both directions of rotation, and a second mode wherein the multimode clutch operatively couples the first axle to the engine driven powertrain so that the first axle and engine driven powertrain rotate together in one direction and rotate independently of each other in an opposite direction.

12. The multimode clutch system of claim 10, wherein the multimode clutch has a third mode wherein the multimode clutch operatively couples the first axle to the engine driven powertrain so that the first axle and the engine driven powertrain rotate together in both directions of rotation.

13. The multimode clutch system of claim 10, wherein the controller is configured to transmit control signals to the electric motor and the internal combustion engine to control speed of the electric motor relative to that of the internal combustion engine as a combined function of vehicle speed and electric motor speed during transitions between powertrains.

14. The multimode clutch system of claim 13, wherein the controller is configured to cause the first powertrain to be locked in both rotational directions of the first axle when the first powertrain is propelling the vehicle.

15. The multimode clutch system of claim 13, wherein the controller is configured to cause the first powertrain to be open in both rotational directions when the second powertrain is propelling the vehicle.

16. The multimode clutch of claim 13, wherein the controller is configured to cause the multimode clutch of the first powertrain to be open in both rotational directions of the first axle during transition of power in the first powertrain from on to off; and
wherein the controller is configured to cause the multimode clutch of the first powertrain to be locked in the driving rotational direction of the first axle and open in the non-driving rotational direction of the first axle when the first powertrain is transitioning from off to on.

17. The multimode clutch of claim 13, wherein the controller is configured to cause the multimode clutch of the second powertrain to be locked in both rotational directions of the rear axle when the electric motor is propelling the vehicle; and
wherein the controller is configured to cause the multimode clutch of the second powertrain to be open in both rotational directions of the second axle when the electric motor is off, and while the engine is propelling the vehicle.

18. The multimode clutch of claim 13, wherein the controller is configured to cause the multimode clutch of the second powertrain to be open in both directions during transition of the electric motor from on to off, while the engine is starting to propel the vehicle; and wherein the controller is configured to cause the multimode clutch of the second powertrain to be locked in the driving direction and open in the non-driving direction during transition of the electric motor from off to on, while the engine is propelling the vehicle.

* * * * *